United States Patent
Di Fiore et al.

(10) Patent No.: US 8,885,515 B2
(45) Date of Patent: Nov. 11, 2014

(54) WIRELESS ACCESS POINT

(75) Inventors: Luca Di Fiore, Taipei (TW); Mark C. Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 12/995,403

(22) PCT Filed: May 30, 2008

(86) PCT No.: PCT/US2008/065389
§ 371 (c)(1),
(2), (4) Date: Nov. 30, 2010

(87) PCT Pub. No.: WO2009/145789
PCT Pub. Date: Dec. 3, 2009

(65) Prior Publication Data
US 2011/0069640 A1 Mar. 24, 2011

(51) Int. Cl.
H04L 12/28 (2006.01)
H04L 12/10 (2006.01)
G06F 1/26 (2006.01)

(52) U.S. Cl.
CPC .............. G06F 1/263 (2013.01); H04L 12/10 (2013.01); G06F 1/266 (2013.01)
USPC .......................................... 370/254; 370/338

(58) Field of Classification Search
USPC ................................................. 370/254, 300
See application file for complete search history.

(56) References Cited

U.S. PATENT DOCUMENTS

| 7,016,948 | B1 * | 3/2006 | Yildiz ........................... 709/221 |
| 7,317,896 | B1 * | 1/2008 | Saxena et al. ................ 455/41.2 |
| 7,519,842 | B2 * | 4/2009 | Chen et al. .................... 713/310 |
| 7,672,248 | B2 * | 3/2010 | Morris .......................... 370/252 |
| 7,787,863 | B2 * | 8/2010 | van de Groenendaal ..... 455/411 |
| 8,254,253 | B2 * | 8/2012 | Forssell ........................ 370/230 |
| 2003/0105841 | A1 * | 6/2003 | Miyake et al. ................ 709/220 |
| 2003/0131082 | A1 * | 7/2003 | Kachi ........................... 709/220 |
| 2004/0121648 | A1 * | 6/2004 | Voros ............................ 439/535 |
| 2005/0030946 | A1 | 2/2005 | Carty et al. |
| 2005/0152323 | A1 * | 7/2005 | Bonnassieux et al. ........ 370/338 |
| 2005/0260973 | A1 * | 11/2005 | van de Groenendaal ..... 455/411 |
| 2006/0148403 | A1 | 7/2006 | Martin |
| 2006/0268767 | A1 * | 11/2006 | Sato et al. ..................... 370/328 |

FOREIGN PATENT DOCUMENTS

| CN | 2598050 | 1/2004 | |
| CN | 101056206 A | 10/2007 | |
| JP | 2003-124939 | 4/2003 | |
| JP | 2003124939 | * 4/2003 | ............. H04L 12/28 |

(Continued)

OTHER PUBLICATIONS

Intellectual Property Office, Examination Report under Section 18(3), Appln No. 1020094.7, date of mailing Mar. 1, 2012, 3 p.

(Continued)

*Primary Examiner* — Jonathan C Teixeira Moffat
*Assistant Examiner* — Eyob Hagos

(57) ABSTRACT

An electronic assembly includes a power supply, a wireless access point, and wired network connectivity. Power for the wireless access point may come from the power supply, or alternatively, from power through the wired network. The power supply can also provide removable power to a portable information device. The wireless access point may optionally be configured to communicate wirelessly only with one particular wireless client.

14 Claims, 2 Drawing Sheets

(56) References Cited

FOREIGN PATENT DOCUMENTS

| | | |
|---|---|---|
| JP | 2004-180324 | 6/2004 |
| JP | 2004-282321 | 10/2004 |
| JP | 2004-343497 | 12/2004 |
| JP | 2005-020215 | 1/2005 |
| JP | 2005-117656 | 4/2005 |
| JP | 2006-020017 | 1/2006 |
| JP | 2006-135874 | 5/2006 |
| JP | 2007-142524 | 6/2007 |
| JP | 2007-286850 | 11/2007 |
| JP | 2008-529461 | 7/2008 |
| WO | WO-2007/041106 | 4/2007 |

OTHER PUBLICATIONS

DE Office Action. Appln No. 112008003891.0, date of mailing Feb. 13, 2012, 4 p.
Translation of DE Office Action, Appln No. 112008003891.0, date of mailing Feb. 13, 2012, 2 p.
Examination. Report Under Section 18(3) received in GB Application No. 1020094.7, mailed Sep. 27, 2012, 1 page.
The International Search Report and the Written Opinion of the International Searching Authority dated Feb. 20, 2009, pp. 11.

* cited by examiner

WIRELESS ACCESS POINT

DESCRIPTION OF THE RELATED ART

Users of portable information devices (for example, laptop computers, notebook computers, personal digital assistants, etc.) have two frequent needs: (1) network connectivity and (2) access to electrical power. Short term electrical power may be provided by batteries, but a portable power supply for recharging or extended operation is often also needed. Network connectivity may be wired, wireless, or both. An example of a current wired network standard is IEEE 802.3 (Ethernet). An example of a current wireless network standard is IEEE 802.11. Wireless network access may be provided at airports, coffee shops, and some office environments. In some environments, however only a wired network is available. Current portable information devices often have wireless networking capability, and wired network capability with a connector for a wired network cable, and a connector for external power (for powering operation, or battery charging, or both). A mobile user of such a portable device often carries an external power supply in addition to the portable information device. There is an ongoing need for improved portability.

DETAILED DESCRIPTION

Some portable information devices are becoming so small and, thin that a connector for wired networking would impact the overall thickness of the product. Accordingly, it is desirable for such products to eliminate the wired network electronics and connector, and provide only wireless networking capabilities. This enables a smaller thinner portable information device. However, some usage locations only have a wired network available. A Wireless Access Point (WAP) is a device that may be used to connect wireless communication devices (wireless clients) to a wired network, and can relay data between wired and wireless devices. If a user of a portable information device having only wireless networking needs to always have access to a network, then a WAP device may also need to be carried. The user then needs to carry the portable information device, a WAP, and a power supply. As described in further detail below, a WAP, in accordance with an example embodiment of the invention, provides power for the portable information device, eliminating the need for a separate portable power supply.

Figure 1A:
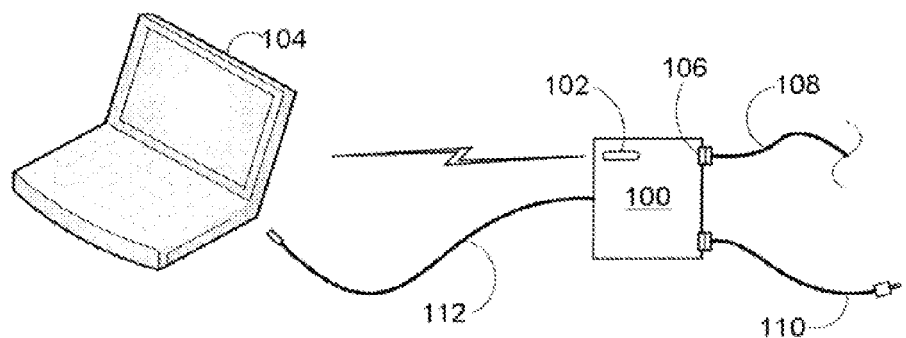
FIG. 1A is a block diagram illustrating an example embodiment of a Wireless Access Point.

FIG. 1A illustrates an example WAP assembly 100, which includes an antenna 102 for wireless bi-directional communication with a portable information device 104. The portable information device 104 is a wireless client of the WAP assembly 100. The WAP assembly 100 has a connector 106 for a wired network cable 108. The WAP assembly 100 also has a power input cable 110 for connecting to an AC mains. Finally, the WAP assembly 100 has a power output cable 112 for providing power to the portable information device 104. Using an internal power supply for the WAP assembly 100 to also provide power (for operation, or for battery recharging, or both) for the portable information device 104 means that a user of the portable information device 104 does not have to carry a separate power supply. The user of the portable information device can carry a single accessory (WAP assembly 100) for power and for network connectivity in a wired network environment.

In FIG. 1A, the antenna 102 may extend from the WAP assembly 100 or may be embedded. Each of the cables 108, 110, and 112 may be attached or may connect through a connector. The WAP assembly may plug directly into an AC mains instead of having a separate AC power cable.

Figure 1B:
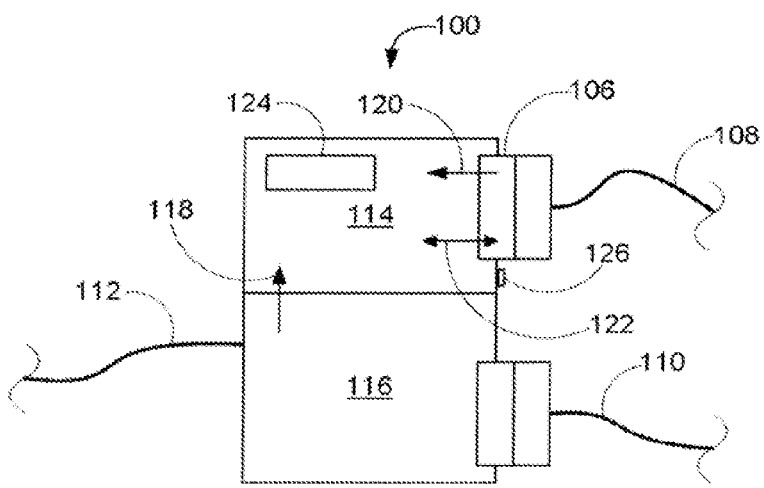
FIG. 1B is a block diagram illustrating additional detail for the example Wireless Access Point of FIG. 1A.

FIG. 1B illustrates additional detail for WAP assembly 100. WAP assembly 100 includes a WAP electronics section 114 that provides the WAP functionality (used to connect wireless communication devices to a wired network, and can relay data between wired and wireless devices). The WAP electronics section 114 may receive power from an internal power supply 116, as depicted by arrow 118. Alternatively if power is available from an attached wired network through connector 106, the WAP electronics section 114 may receive power from the network, as depicted by arrow 120. The network adapter sends and receives data to and from a wired network through connector 106, as depicted by double arrow 122. Power supply 116 also provides removable power to a portable information device, via cable 112, when needed.

If the wired network is Ethernet, then connector 106 typically has 8 positions and 8 contacts having a wiring scheme named T568A/B, with the physical connector commonly referred to as a RJ45 jack. In some configurations, a pair of the contacts is used for Power over Ethernet (PoE). If PoE is available, then the WAP electronics section 114 may optionally receive power from the network.

A typical WAP can communicate with 30 wireless clients located within about 100 m. Typically, a WAP broadcasts a Service Set Identifier (SSID), and all wireless devices within range can detect the presence of the WAP and read its identifier. Accordingly, adding a WAP into a wired network environment can create security issues. In contrast, in an example embodiment, WAP assembly 100 is configured for use by only a single wireless client (portable information device 104). In FIG. 1B, WAP electronics section 114 includes a controller 124 that also includes non-volatile memory. When WAP assembly 100 is paired to a wireless client, controller 124 stores the Media Access Control (MAC) address of the wireless client in non-volatile memory. After that the WAP assembly 100 will communicate wirelessly only with the wireless client having the stored MAC address.

The process of secure pairing is as follows. In the default state, SSID broadcast is disabled. A name, a password, and an encryption key are installed in the WAP's controller memory at manufacturing time, and/or provided along with the WAP on a computer readable medium, so that only the purchaser of the WAP along with the computer readable medium can pair the WAP to a wireless client. The computer readable medium includes code for pairing a wireless client to the WAP. Only a wireless client providing the proper SSID, name, password, with information properly encrypted, can cause the WAP to record the MAC address of the wireless client. Once a MAC address is stored by the controller 124, in the future the WAP assembly 100 will communicate wirelessly only with the wireless client having the stored MAC address.

In may be desirable to pair the WAP assembly 100 with a different wireless client after a first MAC address has been stored. In FIG. 1B, an optional SYNC push-button switch 126 will cause the WAP electronics section 114 to erase any stored MAC address, and to reinitiate the pairing (synchronization)

process. The new wireless client must know the SSID, name, password, encryption key, etc to enable it to pair with the WAP assembly 100.

Figure 2:
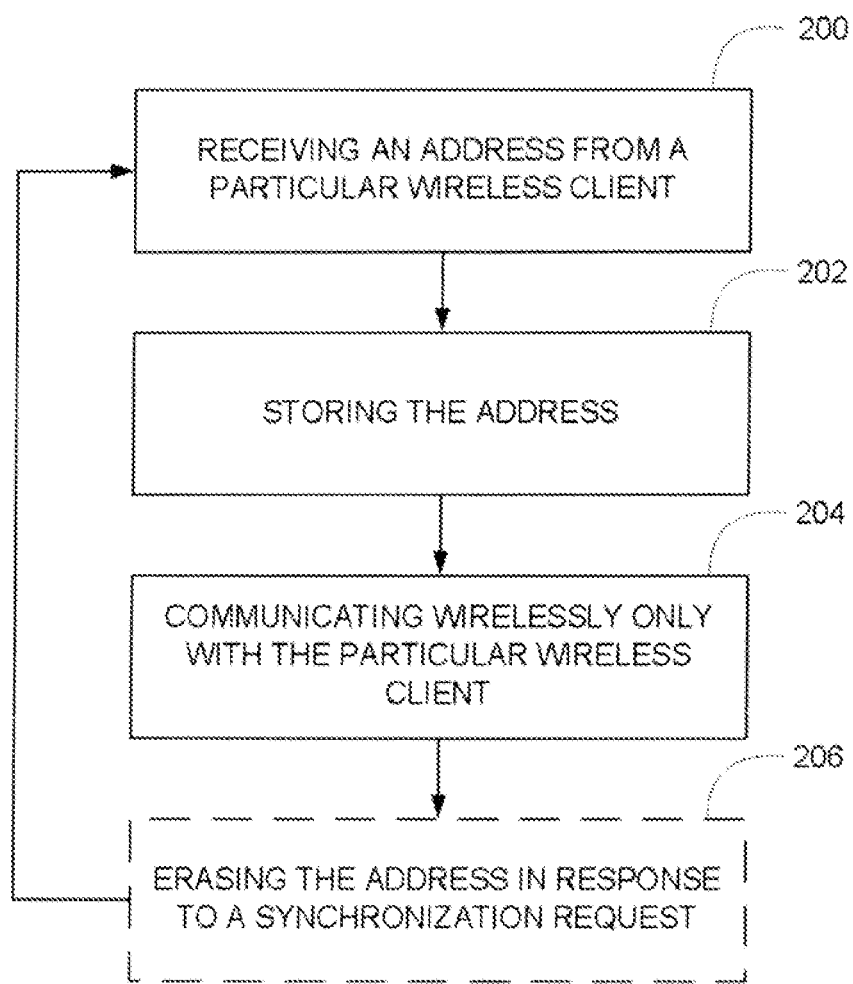
FIG. 2 is a flow chart illustrating an example method for configuring a Wireless Access Point.

FIG. 2 illustrates an example method for optionally configuring WAP assembly 100. At step 200 a WAP receives an address of a particular wireless client. At step 202, the WAP stores the address. At step 204, the WAP then communicates wirelessly only with the particular wireless client. At step 206, in response to a synchronization request (for example, by pressing SYNC switch 126), the WAP erases the stored MAC address and starts the process again from the beginning. Not all of the steps in FIG. 2 are required. For example, step 206 occurs only if a synchronization request is received.

RF transmitters are prohibited in some environments, for example, parts of some hospitals. However, a user of a portable information device may still want to use the WAP assembly 100 as a power supply or charger without wireless communication. To avoid unintended RF transmission, the WAP electronics section 114 turns on wireless transmission only if a network cable is connected to connector 106.

What is claimed is:

1. An electronic assembly, comprising:
   a wireless access point for connecting to a wired network;
   the wireless access point comprising a connection for receiving power from a power supply;
   the wireless access point comprising a connection for providing power to a separate device; and
   the wireless access point comprising a wireless electronics section for turning on wireless transmission only when a network cable is connected to a wired network connection of the wireless access point, and turning off wireless transmission when a network cable is not connected to the wired network connection.

2. The electronic assembly of claim 1, the wireless access point further comprising:
   connection for receiving power from the wired network.

3. The electronic assembly of claim 1, the wireless access point further comprising:
   a controller having non-volatile memory, the non-volatile memory storing an address of a particular wireless client, the wireless access point configured to communicate wirelessly only with the particular wireless client.

4. The electronic assembly of claim 3, the wireless access point further comprising:
   a switch, wherein activation of the switch causes the wireless access point to erase the stored address and to initiate a synchronization process.

5. The electronic assembly of claim 1, the wireless access point providing power to the separate device with and without providing wireless transmission.

6. A wireless access point assembly, comprising:
   a power input to communicate power from a power supply to the wireless access point assembly;
   a power output to communicate power from the wireless access point assembly to a portable information device;
   a wired network connector to facilitate wired communication with a wired network; and
   a wireless electronics section to facilitate wireless communication with the portable information device,
   wherein the wireless electronics section turns on wireless transmission only if a network cable is connected to the wired network connector and turns off wireless transmission if a network cable is not connected to the wired network connector.

7. The wireless access point assembly of claim 6, wherein the wired network connector includes the power input.

8. The wireless access point assembly of claim 6, wherein the wireless access point assembly provides power to the portable information device for one or more of operation of the portable information device and battery recharging of the portable information device.

9. The wireless access point assembly of claim 6, further comprising:
   an internal power supply to power the wireless access point assembly.

10. The wireless access point assembly of claim 9, wherein the internal power supply of the wireless access point assembly provides power to the portable information device.

11. The wireless access point assembly of claim 10, wherein the internal power supply of the wireless access point assembly provides power to the portable information device independent of whether the wireless access point assembly is connected to an AC mains.

12. The wireless access point assembly of claim 9, wherein the wireless access point assembly provides power to the portable information device if a network cable is connected to the wired network connector and if a network cable is not connected to the wired network connector.

13. The electronic assembly of claim 1, the wireless access point providing power to the separate device with and without connection of the wireless access point to an AC mains.

14. The electronic assembly of claim 1, the wireless access point providing power to the separate device independent of whether the wireless access point is connected to the wired network.

* * * * *